May 6, 1930.  H. W. JOY  1,756,980
ADVERTISING DEVICE
Filed June 22, 1926
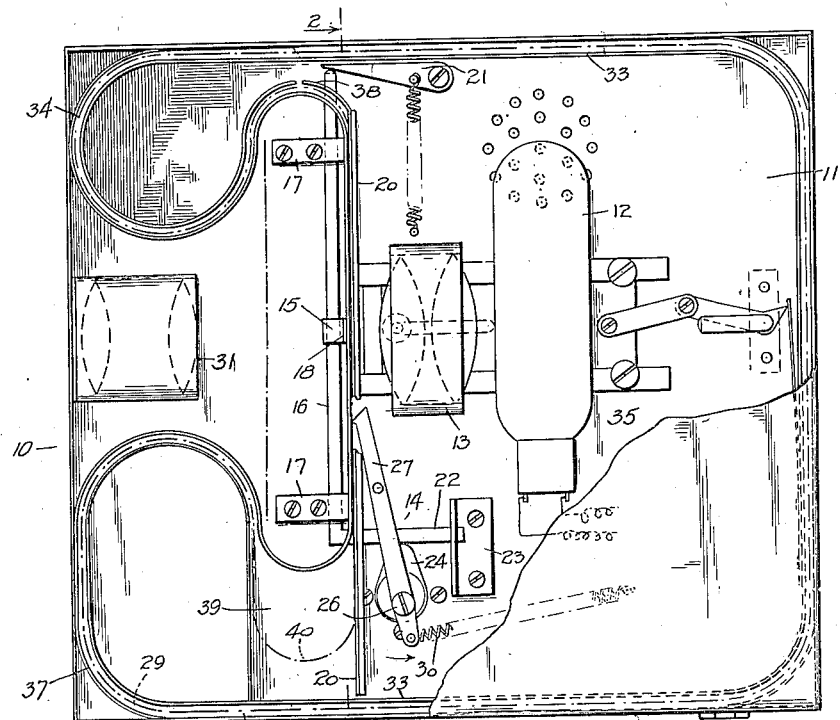
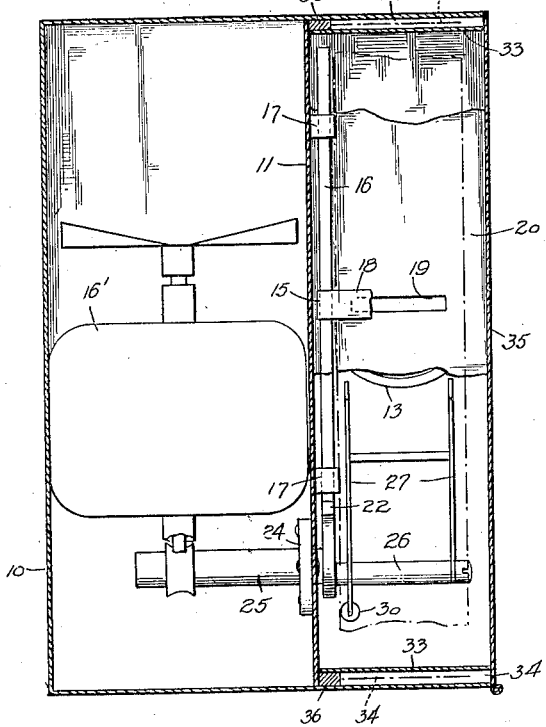
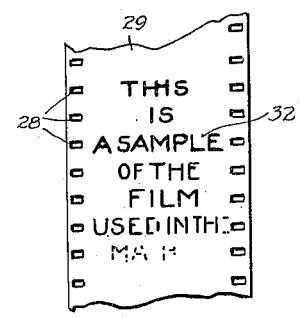
HENRY W. JOY
INVENTOR
BY
his ATTORNEY Patented May 6, 1930

1,756,980

UNITED STATES PATENT OFFICE

HENRY W. JOY, OF NEW YORK, N. Y.

ADVERTISING DEVICE

Application filed June 22, 1926. Serial No. 117,657.

This invention relates to improvements in picture projection apparatus and has reference to a device especially adapted for advertising purposes.

Projection apparatus of this character is utilized essentially in window displays and other restricted spaces demanding a small compact device, which can be depended upon to operate continuously without constant care and attention, and which is specially constructed to handle continuous lengths of film without the risk of the latter igniting during operation of the device.

Titles and printed matter used in ordinary film comprise a sufficient number of repeats to run through the machine at the regular speed and to retain the reading on the screen a period of sufficient duration to enable the reader to fully comprehend the characters. If the film were allowed to remain stationary to project a title the light would almost immediately ignite the film material. To utilize the ordinary method of handling titles and printed matter in an advertising device of this character, it would entail the use of a large quantity of film, in addition to more or less complicated mechanism necessary to accommodate reels etc.

In order to overcome the difficulties pointed out in the foregoing, I propose to use, a form of optical projection upon a suitable screen, a recurring and repeating sequence of different words, lines of words etc., so that each pause in the film will be of sufficient duration to enable the matter to be read and fully understood. Simultaneously with the movement of the film toward the succeeding word line the projecting light may be cut off by means of a shutter mechanism operating synchronously with the projection device.

The prepared film used with my invention preferably comprises a series of words in single sequence, photographically recorded upon a suitable length of the material, the ends of which are joined together to form a continuous loop. Suitable mechanism is employed to feed at one time the smallest area of film possible and necessary to contain a single line containing a word or words. It will be clear that the time required to comprehend a single word or line of reading matter is very short, almost instantaneous, and for this reason the pause of the film for each projection may be sufficiently short to avoid ignition of the material disposed in the light rays.

In order to further guard against ignition of the film, the present invention has for its principal object to provide a fire proof guideway which entirely encloses the film throughout its length except at the point where the film is disposed in front of the light rays. The film confined within the duct or passage will not be ignited even if the rays of light should burn through the film at one point because the air within the passage would be insufficient to support combustion.

One embodiment of my invention is illustratively exemplified in the accompanying drawing, in which Figure 1 is a longitudinal elevational view of my improved projector, showing the side door or wall broken away to disclose otherwise hidden parts; Figure 2 is a transverse sectional view of the device taken on lines 2—2 of Figure 1; and Figure 3 is a detail view of the film used in connection with the apparatus.

Referring to the drawings, 10 denotes a rectangular box, constructed preferably of metal and having top, bottom, and side walls as illustrated. The box 10 is divided into two compartments by a partition wall 11, which is disposed longitudinally of the box and in upright position, and which according to the present embodiment of the invention carries substantially all of the projection and operating elements, such as the lamp 12, lenses 13, intermittent motion apparatus 14, and shutter 15. These elements are all disposed in one compartment, i..e. on one side of the partition 11, while the compartment on the opposite side contains the motor 16' for operating the intermittent movement 14 and shutter 15.

The details of the lamp 12, lenses 13 and their manner of support and control will not be discussed here since they form no part of the invention except as a unit in a complete apparatus.

The shutter and intermittent operating devices will be described in detail in so far as they effect the operation of the invention. The shutter comprises an upright reciprocating rod 16 supported and moving in suitable brackets 17 fixed on the partition 11 adjacent the upper and lower ends thereof, and an arm 18 carried at one end by and disposed midway of the length of the rod 16, the arm being formed of a flat narrow strip operating to cover and uncover a slot or opening 19 in a plate 20 carried by the lens slide, the plate overlying the path of the film before the lens 13. The shutter rod 16 is normally being yieldably depressed by a spring actuated arm 21 arranged on the partition 11 and operating on the upper end of the rod itself. The lower end of the rod 16 is provided with an arm 22 projecting at right angles to the axis of the rod and in a direction towards the rear of the box 10. The free end of the arm 22 is guided in a plate 23 fixed on the partition, and having its mid-portion supported on the surface of a rotary cam 24, the high point thereof being capable of lifting the rod and consequently the arm 21 to an elevation substantially above the opening 19 to uncover the same. The cam 24 rotates with a shaft 25 projecting through the partition 11 into the adjoining compartment and being operatively connected with the electric motor 16'. The shaft 25 at its end, beyond the cam 24, carries a crank pin 26 which is disposed on the side of the axis of the shaft 25, opposite to the high point of the cam and accommodates a ratchet 27 comprising a pair of lever arms spaced from each other on the pin 26 to register at their upper free ends in the perforations 28 of the film 29. The upper ends of the lever arms are held in yieldable contact with the film 29 by a spring connection 30 operating on a projection of one of the levers beyond the crank pin 26, as illustrated in Figure 1. The arrangement just described is such that when the crank pin 26 has stepped the film downwardly one step the cam 24 will immediately lift the shutter mechanism to allow the projected light rays to pass outwardly through opening 19 to the projecting lens 31.

The film 29, as previously stated, comprises a continuous strip of celluloid, having its marginal portion perforated in any desired manner, i. e. number of perforations to the inch. Between each set of corresponding perforations on opposite sides of the film, the latter is provided with a line containing a word or series of words 32, as illustrated in Figure 3, which if followed form left to right and from line to line, as they appear before the opening 19 and are projected upon a screen, will convey to the reader a complete sentence. Because I propose projecting only one line at a time and since I intend to utilize the longest possible period of exposure of each line before the light, there will be ample time for the line to be read and understood before the next line takes its place. Preferably I propose to arrange a series of words in single sequence photographically recorded upon a suitable length of film, the ends thereof being joined together to form a loop. The perforations 28 are spaced preferably as close as the minimum word or picture area will permit and as a consequence the projecting and feeding of the film will be accomplished at the approximate rate of one hole per cycle of operation of the feeding and shutter mechanism, such rate is figured to permit an exposure of approximately one second duration. By the use of such film and mechanism I am enabled to utilize inflammable film without fear of ignition taking palce, because only one word or its equivalent is exposed to the heat rays of the lamp and the word area itself is so reduced that the film used is of minimum length.

In order to construct a box 10 which will contain a fire proof compartment for the film loop, I have arranged a wall 33 of metal extending completely around the sides of the projecting chamber. This wall 33 is spaced from the top, end and bottom of the box 10 to provide a passage and magazine 34 which is isolated from the rest of the compartment when the cover or side wall 35 is closed. The cover 35 is a flat plate suitably attached to an edge of the box and arranged to close the compartment as illustrated in Figures 1 and 2. The wall 33 projects from the face of the partition outwardly to the open side of the box and at its inner end is spaced from the outside wall by a spacing block 36. At the front wall of the device the wall 33 is joined by a spaced parallel wall 37. The parallel walls 33 and 37 are arranged in an ogee curve towards the plate 20. The wall 37 then projects downwardly in a plane closely adjacent to and parallel with the plate 20, overlying the film. The lower end of the same wall 37 continues to follow a second ogee curve terminating in the inner face of the bottom wall. The wall 33, however, terminates on top of the curve which leads to the plate 20 and continues in a second curved strip of wall 38 which connects with the upper end of the plate 20, the latter plate projecting downwardly to a point just short of the bottom section of the wall 33, as illustrated in Figure 1. The lower section of wall 33 at the front follows the wall 37 over the first curve and then drops straight down and engages itself at the bottom of the box. This construction forms a pocket 39 below the intermittent movement to accommodate the loop 40 necessary to successful operation of intermittently fed film. Thus it will be clear that the film when once properly installed within the passage 34 is completely enclosed except as it passes the opening 19 in the plate 20 and wall 37. To install the film the cover 35 is opened and the plate 20 being a longitudinally adjustable member is likewise withdrawn from the shutter, whereupon the loop of film is inserted in the passage 34, the loop is then formed in the pocket 39 and the plate 20 and cover 35 closed. If ignition by any chance should take place at the point where the film passes the opening 19, the remaining portions in the passage 34 would fail to burn due to the lack of support for further combustion.

What I claim and desire to secure by Letters Patent is:—

1. In a picture projection apparatus, mechanism for intermittently transmitting a continuous loop of picture bearing film so that successive parts of the film will be exposed to the lens, a casing completely enclosing the mechanism, and a substantially continuous enclosed film guide comprising a metal tunnel adapted to maintain the film in unwound closely protected condition throughout its travel in the apparatus, said tunnel being provided with a pocket adjacent one side of the lens to accommodate a loop in the film, and a removable closure for an opening in the tunnel projecting before the lens.

2. In a picture projection apparatus, mechanism for intermittently transmitting a continuous loop of picture bearing film so that successive parts of the film will be exposed to the lens, a substantially continuous enclosed film guide adapted to maintain the film in unwound protected condition throughout its travel in the apparatus, and comprising a metal tunnel substantially the length of the film and provided with an extended portion to accommodate a loop in the film, the wall of the tunnel before the lens being provided with an opening to facilitate installation of the film, a closure for said opening, and a reciprocating shutter operating over an opening in the wall of the tunnel and closure at a point coinciding with the optical axis of the lens.

3. In a picture projection apparatus, a casing open at one side, a partition parallel with the open side and arranged within the casing, mechanism carried by said partition for intermittently transmitting a continuous loop of picture bearing film so that successive parts of the film will be exposed to the lens, a substantially continuous film guide adapted to maintain the film in unwound protected condition throughout its travel in the apparatus, said guide being formed by walls arranged upright from the partition and spaced from the adjacent walls of the casing at certain parts and provided with parallel walls where the guide is disposed inwardly from the casing walls to a position before the lens, a section of one of the walls before the lens being removable to facilitate installation of the film, a shutter operating to open and close an opening in the guide walls arranged coaxially of the optical axis of the lens, and a cover for the casing to fit over both walls of the film guide to completely enclose the same.

4. In a picture projection apparatus, a casing open at one side, a partition parallel with the open side and arranged within the casing, mechanism carried by said partition for intermittently transmitting a continuous loop of picture bearing film so that successive parts of the film will be exposed to the lens, a substantially continuous film guide adapted to maintain the film in unwound protected condition throughout its travel in the apparatus, said guide being formed by walls arranged upright from the partition and spaced from the adjacent walls of the casing at certain parts and provided with parallel walls where the guide is disposed inwardly from the casing walls to a position before the lens, a section of one of the walls before the lens being removable to facilitate installation of the film and a cover for the casing to fit over both walls of the film guide to completely enclose the same.

In testimony whereof I affix my signature.

HENRY W. JOY.